United States Patent
Reyes Marcial et al.

(10) Patent No.: US 12,441,243 B2
(45) Date of Patent: Oct. 14, 2025

(54) ANTI-THEFT COUNTERMEASURES FOR MIRROR ASSEMBLIES IN VEHICLES

(71) Applicant: Nissan North America, Inc., Franklin, TN (US)

(72) Inventors: Jesus Reyes Marcial, Temoaya (MX); Arturo Cruz Hernandez, Mexico City (MX)

(73) Assignee: Nissan North America, Inc., Franklin, TN (US)

( * ) Notice: Subject to any disclaimer, the term of this patent is extended or adjusted under 35 U.S.C. 154(b) by 763 days.

(21) Appl. No.: 17/733,555

(22) Filed: Apr. 29, 2022

(65) Prior Publication Data

US 2023/0347822 A1 Nov. 2, 2023

(51) Int. Cl.
*B60R 1/062* (2006.01)

(52) U.S. Cl.
CPC ................ *B60R 1/062* (2013.01)

(58) Field of Classification Search
CPC ............. B60R 1/06; B60R 1/062; B60R 1/07; B60R 1/072; G02B 7/182
USPC .................................. 359/871, 872, 877
See application file for complete search history.

(56) References Cited

U.S. PATENT DOCUMENTS

| | | | | |
|---|---|---|---|---|
| 4,488,778 A * | 12/1984 | Polzer | ................. | B60R 1/06 403/349 |
| 4,696,555 A * | 9/1987 | Enomoto | ................. | B60R 1/072 359/877 |
| 4,867,408 A * | 9/1989 | Ozaki | ................. | G11B 7/2472 248/483 |
| 4,877,214 A * | 10/1989 | Toshiaki | ................. | B60R 1/072 248/483 |
| 4,981,279 A * | 1/1991 | Andreas | ................. | B60R 1/072 248/478 |
| 5,604,645 A * | 2/1997 | Weaver | ................. | B60R 1/072 248/27.3 |
| 5,721,646 A * | 2/1998 | Catlin | ................. | B60R 1/081 359/872 |
| 6,325,519 B1 * | 12/2001 | Lang | ................. | B60R 1/0605 359/881 |
| 9,840,200 B2 * | 12/2017 | de Swardt | ................. | B60R 1/06 |
| 10,654,416 B2 * | 5/2020 | Cano | ................. | B60R 1/072 |
| 2002/0001147 A1 | 1/2002 | Zapadinsky | | |
| 2006/0245025 A1 | 11/2006 | Tonar et al. | | |
| 2010/0296189 A1* | 11/2010 | Lettis | ................. | B60R 1/06 359/876 |
| 2017/0059814 A1 | 3/2017 | Lang et al. | | |
| 2019/0071016 A1* | 3/2019 | Lettis | ................. | B60R 1/074 |
| 2020/0276935 A1 | 9/2020 | Ballarin | | |
| 2023/0226997 A1* | 7/2023 | Cruz Hernandez | ....... | B60R 1/06 359/871 |

* cited by examiner

*Primary Examiner* — Ricky D Shafer
(74) *Attorney, Agent, or Firm* — Young Basile Hanlon & MacFarlane, P.C.

(57) ABSTRACT

A mirror assembly for a vehicle is disclosed that includes: a support bracket that includes a bracket clip; a mirror glass that is connected to the support bracket; an actuator assembly that includes a retainer and which is configured for engagement with the bracket clip such that movement of the actuator assembly causes corresponding movement of the support bracket and the mirror glass; and a retention clip that is configured for positioning about the retainer and the bracket clip to inhibit separation of the support bracket and the actuator assembly and thereby deter theft of the mirror glass.

20 Claims, 9 Drawing Sheets

ANTI-THEFT COUNTERMEASURES FOR MIRROR ASSEMBLIES IN VEHICLES

TECHNICAL FIELD

The present disclosure relates to mirror assemblies for vehicles. More specifically, the present disclosure relates to mirror assemblies (e.g., side-view mirror assemblies) that include an anti-theft countermeasure to inhibit (if not entirely prevent) theft of the mirror glass.

BACKGROUND

While certain efforts have been made to combat the theft of (side-view) mirror assemblies in vehicles, known countermeasures often intrude upon the mirror glass, thereby compromising visibility, and/or require the use of an adhesive, which can result in unreliable fixation due to variations in the materials of construction used by the OEMs (original equipment manufacturers).

The present disclosure addresses these issues, however, and describes mirror assemblies including an anti-theft countermeasure that mechanically secures the mirror glass while maintaining full visibility.

SUMMARY

In one aspect of the present disclosure, a mirror assembly for a vehicle is disclosed that includes: a support bracket that includes a bracket clip; a mirror glass that is connected to the support bracket; an actuator assembly that includes a retainer and which is configured for engagement with the bracket clip such that movement of the actuator assembly causes corresponding movement of the support bracket to reposition the mirror glass; and a retention clip that is configured for positioning about the retainer and the bracket clip to inhibit separation of the support bracket and the actuator assembly and thereby deter theft of the mirror glass.

In certain embodiments, the support bracket may include a plurality of bracket clips and the actuator assembly may include a plurality of retainers.

In certain embodiments, the plurality of bracket clips may be separated by an angular distance of approximately 90°.

In certain embodiments, the plurality of retainers may be separated by an angular distance of approximately 90°.

In certain embodiments, the retention clip may include: a first leg; a second leg; and a backspan that connects the first leg and the second leg.

In certain embodiments, the first leg may extend from the backspan at a first angle and the second leg may extend from the backspan at a second angle.

In certain embodiments, the first angle and the second angle may be non-identical such that the first leg and the second leg extend in non-parallel relation.

In certain embodiments, the second angle may be less than the first angle such that the second leg extends towards the first leg.

In certain embodiments, the second leg may define a guide surface that is configured for engagement with the retainer to facilitate rotation of the retention clip in relation to the actuator assembly and proper installation of the retention clip.

In certain embodiments, the second leg may define a window that is configured to receive the bracket clip such that the bracket clip extends into the retention clip.

In certain embodiments, the actuator assembly may include a main body portion that defines a channel extending about a periphery thereof.

In certain embodiments, the retainer may extend radially outward from the main body portion.

In certain embodiments, the first leg may be configured for insertion into the channel.

In another aspect of the present disclosure, a mirror assembly for a vehicle is disclosed that includes: an outer housing; a support bracket that is located within the outer housing and which includes a bracket clip; an actuator assembly including a retainer that is received by the bracket clip so as connect the support bracket and the actuator assembly; a mirror glass that is connected to the support bracket; and a retention clip that is connected to the actuator assembly in an interference fit such that the retention clip spans the bracket clip and the retainer so as to inhibit removal of the retainer from the bracket clip, thereby locking together the support bracket and the actuator assembly.

In certain embodiments, the retention clip may define a window.

In certain embodiments, the bracket clip may extend into the retention clip through the window.

In certain embodiments, the retention clip may include a backspan and a pair of legs that extend from the backspan in non-parallel relation.

In certain embodiments, the pair of legs may include non-identical configurations.

In certain embodiments, the retention clip may further include a foot that is in engagement with the retainer.

In another aspect of the present disclosure, a mirror assembly for a vehicle is disclosed that includes: a support bracket; a mirror glass that is connected to the support bracket; an actuator assembly that includes a retainer defining a receptacle; and a retention bracket that is configured for positioning about the actuator assembly. The actuator assembly and the support bracket include corresponding attachment structures that are configured for engagement to thereby connect the support bracket and the actuator assembly such that movement of the actuator assembly causes corresponding movement of the support bracket and the mirror glass. The retention bracket includes a locking ring and an anchor. The locking ring is configured to overlie the corresponding attachment structures so as to inhibit disconnection of the support bracket and the actuator assembly and thereby deter theft of the mirror glass. The anchor extends from the locking ring and is configured for insertion into the receptacle to thereby connect the retention bracket and the actuator assembly.

In certain embodiments, the anchor may be resiliently reconfigurable between a normal configuration, in which the anchor defines a first transverse cross-sectional dimension, and a deflected configuration, in which the anchor defines a second transverse cross-sectional dimension less than the first transverse cross-sectional dimension.

In certain embodiments, the receptacle may define a third transverse cross-sectional dimension, wherein the first transverse cross-sectional dimension exceeds the third transverse cross-sectional dimension such that, upon insertion into the receptacle, the anchor inhibits disconnection of the retention bracket and the actuator assembly.

In certain embodiments, the anchor may include a shaft and a plurality of leaves that extend radially outward from the shaft such that the plurality of leaves are movable in relation to the shaft during reconfiguration of the anchor between the normal configuration and the deflected configuration.

In certain embodiments, the anchor may further include a stop that is located on the shaft and which is configured for engagement with the receptacle to inhibit over-advancement of the retention bracket.

BRIEF DESCRIPTION OF THE DRAWINGS

According to common practice, the various features of the drawings may not be to scale and may be arbitrarily expanded or reduced for clarity.

DETAILED DESCRIPTION

In one embodiment of the present disclosure, a mirror assembly (e.g., a side-view mirror assembly) for a vehicle is disclosed that includes: a support bracket including a bracket clip; a mirror glass that is connected (affixed) to (e.g., supported by) the support bracket; an actuator assembly that is connected to the support bracket such that movement of the actuator assembly results in corresponding movement of the support bracket to thereby adjust the position of the mirror glass; and an anti-theft countermeasure, which is configured as a retention (locking) clip. The retention clip is configured for positioning about the bracket clip and a retainer on the actuator assembly to inhibit separation of the support bracket and the actuator assembly and thereby deter theft of the mirror glass.

In another embodiment of the present disclosure, the support bracket and the actuator assembly include corresponding attachment structures that are configured for engagement to thereby connect the support bracket and the actuator assembly. In order to inhibit disconnection of the support bracket and the actuator assembly and thereby deter theft of the mirror glass, the mirror assembly includes an anti-theft countermeasure that is configured as a retention bracket. The retention bracket includes a locking ring that is configured to overlie the corresponding attachment structures on the support bracket and the actuator assembly so as to inhibit disconnection thereof and one or more anchors that extend from the locking ring and which are configured for insertion into receptacles on the actuator assembly.

In another embodiment of the present disclosure, the anti-theft countermeasure includes a fastener (e.g., a self-tapping screw) that extends through the support bracket and into the actuator assembly. It is envisioned that the fastener may be provided as a standalone means of deterring theft of the mirror glass or that the fastener may be combined with either of the aforedescribed anti-theft countermeasures.

With reference to FIGS. 1-6, a mirror assembly 10 for a vehicle is illustrated that includes: an outer housing 100; an actuator assembly 200 that is positioned within the outer housing 100; a support bracket 300 that is connected to the actuator assembly 200 such that the support bracket 300 is located rearwardly (axially, longitudinally outward) of the actuator assembly 200 along an axis of assembly Y; a mirror glass 400 that is supported by (e.g., affixed or otherwise connected to) the support bracket 300 (e.g., via an adhesive); and an anti-theft countermeasure 500 that is configured for connection to the actuator assembly 200 to thereby lock together the actuator assembly 200 and the support bracket 300 and, thus, deter theft of the mirror glass 400. Although illustrated and described in the context of a side-view mirror assembly on a passenger vehicle, it should be appreciated that the principles of the present disclosure are equally applicable to a variety of vehicles (e.g., trucks, SUVs, vans, boats, airplanes, trains, etc.) and mirror assemblies.

Figure 1:
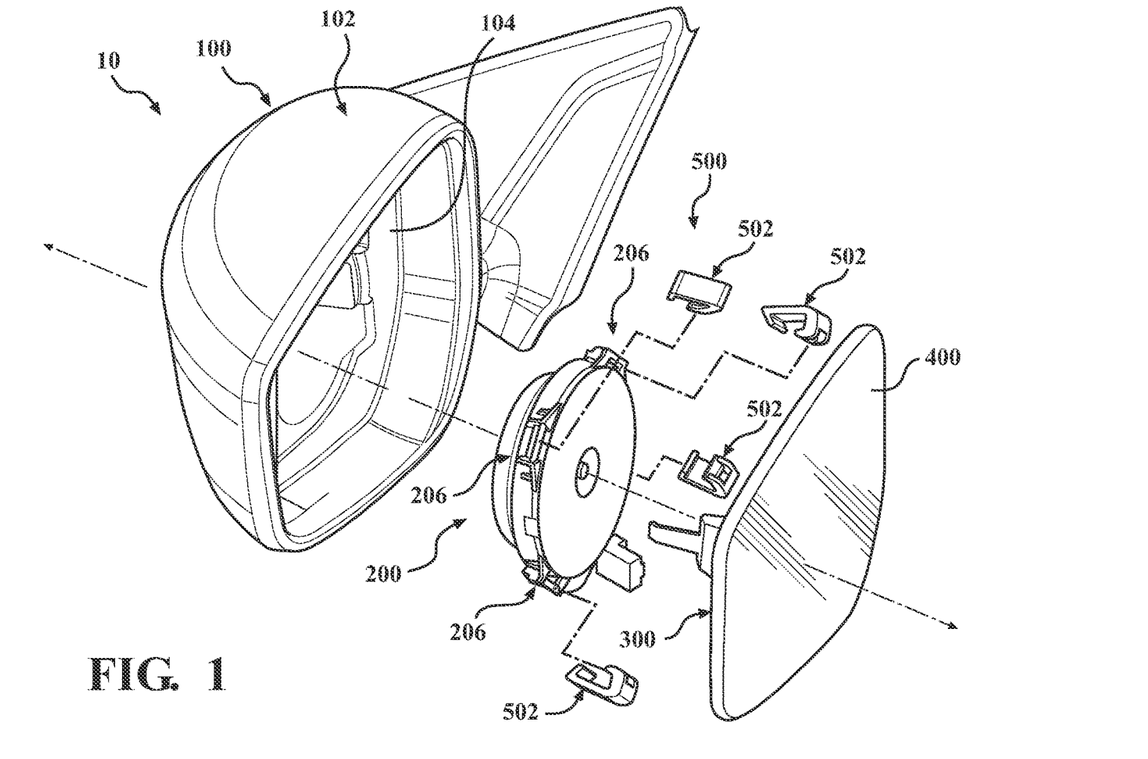
FIG. 1 is a top, perspective view of a (side-view) mirror assembly for a vehicle according to one embodiment of the present disclosure, which includes: an outer housing; a support bracket with a mirror glass affixed thereto; an actuator assembly that is configured for connection to the support bracket; and an anti-theft countermeasure that is configured for connection to the actuator assembly.

The outer housing 100 includes a shell 102 that defines an internal cavity 104, which is configured to receive the actuator assembly 200, the support bracket 300, and the anti-theft countermeasure 500 and, thus, conceal and protect the internal components of the mirror assembly 10. In certain embodiments of the disclosure, it is envisioned that the outer housing 100 may include one or more removable panels to facilitate access to the internal components of the mirror assembly 10, facilitate assembly and disassembly of the mirror assembly 10 during repair, maintenance, and/or service, etc., as described in further detail below.

The actuator assembly 200 includes a main body portion 202 defining a channel 204 that extends about a periphery thereof and one or more (e.g., a plurality of) retainers 206, which extend radially outward from the main body portion 202 along radial axes R (FIGS. 2, 5A, 5B, 6). As described in further detail below, the retainer(s) 206 facilitate connection of the actuator assembly 200 to the support bracket 300, whereby movement of the actuator assembly 200 results in corresponding movement of the support bracket 300, which allows for repositioning of the mirror glass 400 and adjustments in the position thereof.

Each of the retainers 206 includes (first and second) pedestals 208, 210 (FIG. 2) that are connected by a crossbar 212, which extends therebetween so as to define an opening 214 that extends (axially) through the retainer 206 and which is located between the crossbar 212 and the main body portion 202. The crossbar 212 includes: a trunk 216 (FIG. 5B); an inner (first) shoulder 218 that extends radially inward from the trunk 216 (e.g., towards the main body portion 202); and an outer (second) shoulder 220 that extends radially outward from the trunk 216 (e.g., away from the main body portion 202). The trunk 216 extends in parallel (or generally parallel) relation to the axis of assembly Y (FIGS. 1, 5A) of the mirror assembly 10 and terminates in an end portion 222 that defines an (arcuate) contact surface 224.

In the particular embodiment illustrated, the actuator assembly 200 includes four retainers 206 (FIGS. 1, 2) that are spaced circumferentially from each other by a (generally) equivalent angular distance of (approximately) 90°. It should be appreciated, however, that the particular number and/or spacing of the retainers 206 may be altered in various embodiments without departing from the scope of the present disclosure. As such, embodiments of the actuator assembly 200 including both greater and fewer numbers of retainers 206 that are spaced by lesser and greater angular distances are also contemplated herein and would not be beyond the scope of the present disclosure.

The support bracket 300 is configured for connection to both the outer housing 100 and the actuator assembly 200 (along the axis of assembly Y) such that the actuator assembly 200 is positioned (located, captured) between the support bracket 300 and the outer housing 100 within the internal cavity 104 (FIG. 1). More specifically, the support bracket 300 includes one or more (e.g., a plurality of) bracket (spring) clips 302 (FIGS. 2, 3, 5A, 5B, 6) that are configured for (releasable) connection to (engagement with) the retainer(s) 206 on the actuator assembly 200 to thereby connect the support bracket 300 and the actuator assembly 200. As seen in FIGS. 2, 5A, 5B, and 6, each of the bracket clips 302 includes inner and outer (first and second) arms 304, 306, which extend axially (forwards) towards the outer housing 100 (and away from the mirror glass 400) so as to define a chamber 308 therebetween that is configured to receive the crossbar 212 of one of the retainers 206. The arms 304, 306 respectively define (first and second) flanges 310, 312 that are configured for engagement (contact) with the shoulders 218, 220 defined by the crossbar 212, which secures the crossbar 212 within the chamber 308.

The bracket clip(s) 302 correspond in both number and location to the retainer(s) 206 on the actuator assembly 200. As such, in the particular embodiment illustrated, the support bracket 300 includes four bracket clips 302 that are spaced circumferentially from each other by a (generally) equivalent angular distance of (approximately) 90°. It should be appreciated, however, that the particular number and/or spacing of the bracket clips 302 may be altered in various embodiments (e.g., depending upon the particular configuration of the actuator assembly 200) without departing from the scope of the present disclosure. As such, embodiments of the support bracket 300 including both greater and fewer numbers of bracket clips 302 that are spaced by lesser and greater angular distances are also contemplated herein and would not be beyond the scope of the present disclosure.

In the particular embodiment illustrated, the anti-theft countermeasure 500 includes one or more (e.g., a plurality of) retention (locking) clips 502, which correspond in both number and location to the retainer(s) 206 and the bracket clip(s) 302. As such, in the particular embodiment illustrated, the mirror assembly 10 includes four retention clips 502 that are spaced circumferentially from each other by a (generally) equivalent angular distance of (approximately) 900 upon installation. It should be appreciated, however, that the particular number and/or spacing of the retention clips 502 may be altered in various embodiments (e.g., depending upon the particular configuration of the actuator assembly 200 and the support bracket 300) without departing from the scope of the present disclosure. As such, embodiments including both greater and fewer numbers of retention clips 502 that are spaced by lesser and greater angular distances are also contemplated herein and would not be beyond the scope of the present disclosure.

As described in further detail below, the retention clip(s) 502 are configured for connection to (engagement with) the actuator assembly 200 so as to inhibit (if not entirely prevent) unauthorized separation of the actuator assembly 200 and the support bracket 300 and thereby deter theft of the mirror glass 400. More specifically, upon installation, the retention clips 502 span (overlie, are positioned about) the bracket clips 302 and the retainers 206 (FIGS. 4-6) and engage (contact) the retainers 206 in an interference-fit (friction-fit), which is facilitated by the particular geometry of the retention clips 502, as described in further detail below.

Each of the retention clips 502 is identical (or generally identical) in configuration and includes: a pair of legs (e.g., a first leg 504 and a second leg 506), which are dissimilar (non-identical) in configuration, and a backspan 508. In the particular embodiment illustrated, each of the retention clips 502 is integrally (e.g., unitarily, monolithically) formed from a single piece of resilient material, suitable examples of which include, but are not limited to, a plastic material, a polymeric material, a composite material, a metallic material, etc. Embodiments are also envisioned, however, in which the retention clip(s) 502 may include a resilient, multi-material, non-unitary construction. The resilient construction of the retention clip(s) 502 allows the retention clip(s) 502 to flex (e.g., deform, expand and contract) during connection to the support bracket 300 and the actuator assembly 200, as described in further detail below.

Figure 4:
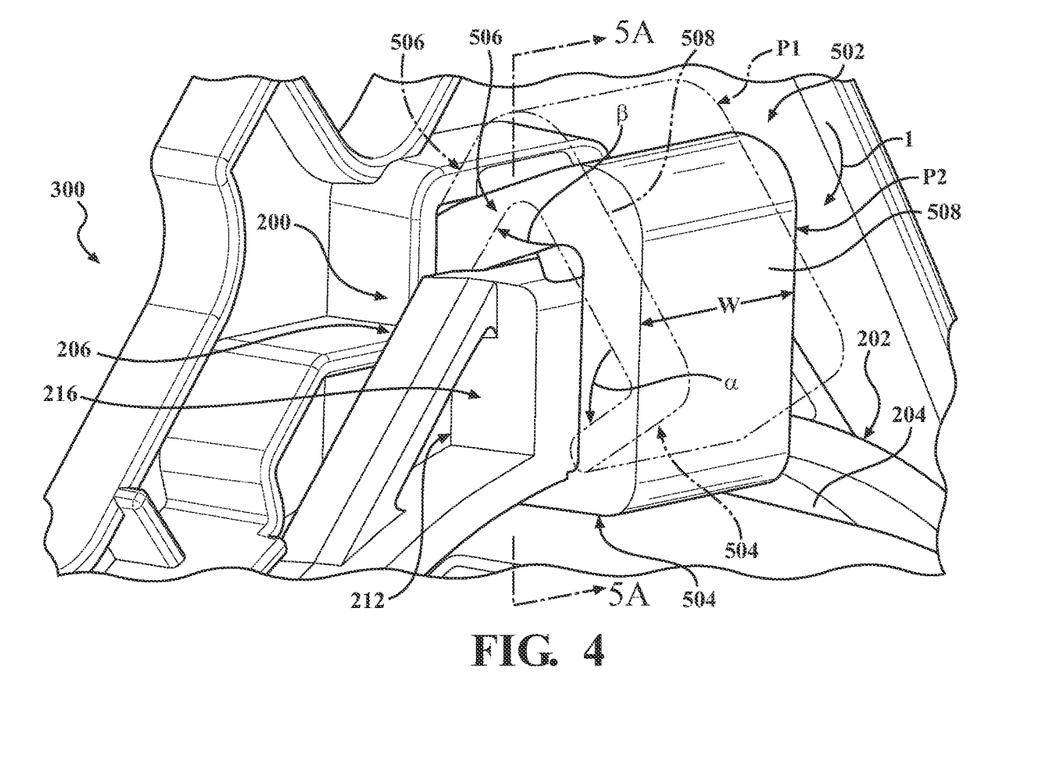
FIG. 4 is a partial, side, perspective view of the mirror assembly illustrating connection of the anti-theft countermeasure and the support bracket to the actuator assembly.
Figure 5A:
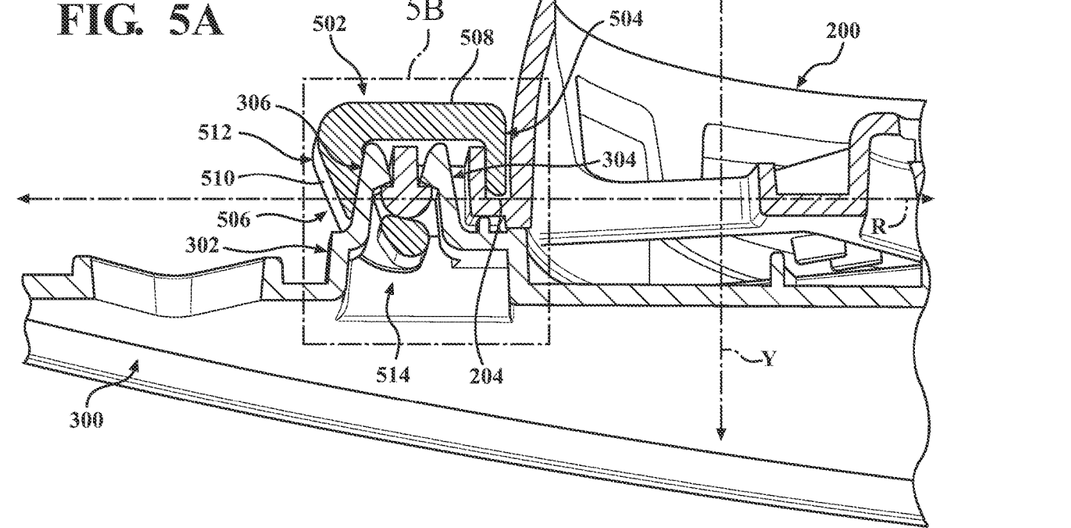
FIG. 5A is a cross-sectional view of the mirror assembly taken through line 5A-5A in FIG. 4.
Figure 5B:
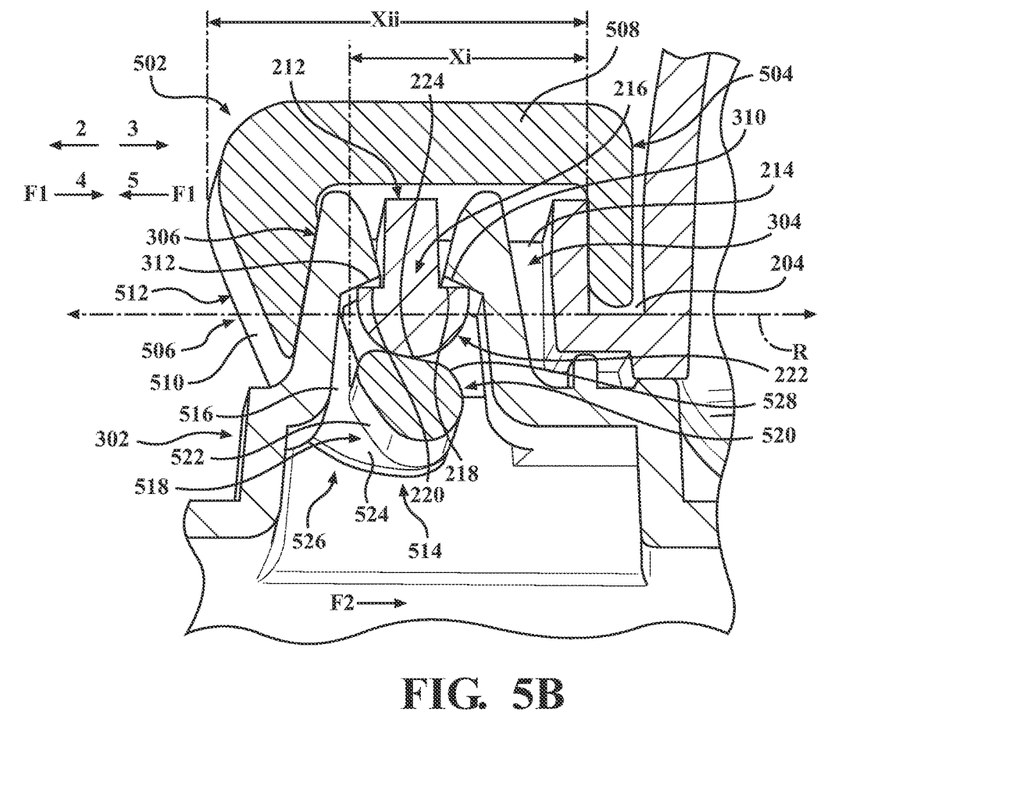
FIG. 5B is an enlargement of the area of detail identified in FIG. 5A.
Figure 6:
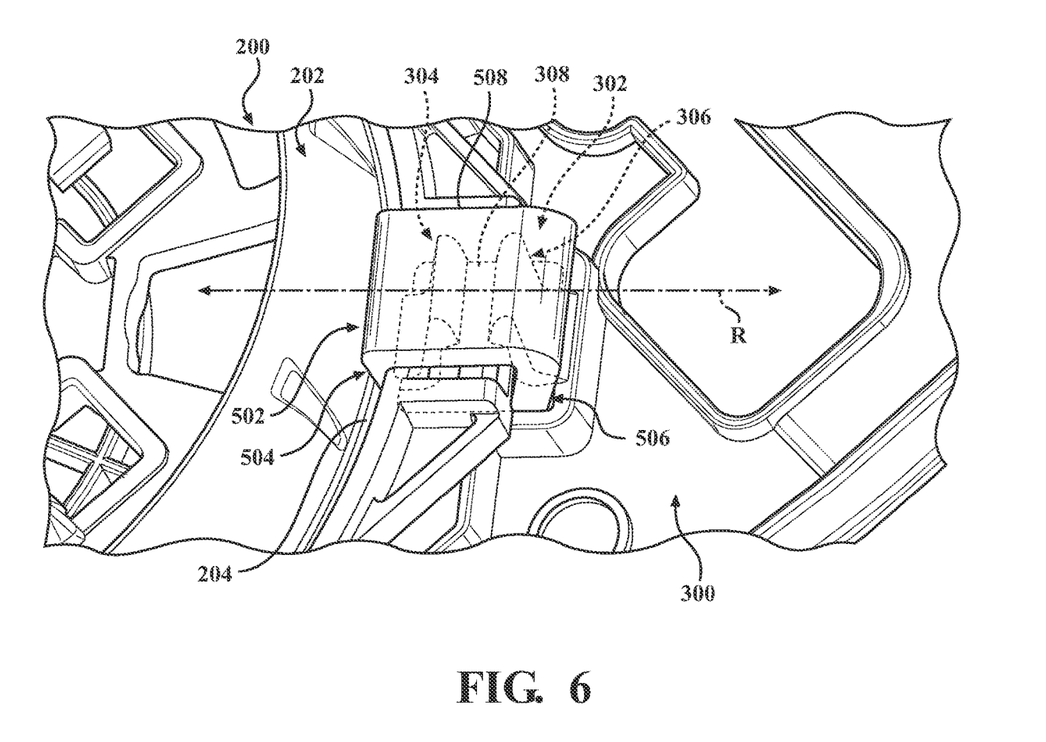
FIG. 6 is a front, perspective view of the mirror assembly upon connection of the anti-theft countermeasure and the support bracket to the actuator assembly.

The first leg 504 is linear (or generally linear) in configuration and is configured for insertion into the channel 204, as seen in FIGS. 4-6. The first leg 504 extends from the backspan 508 at a (first) angle α (FIG. 4) that lies (substantially) within the range of (approximately) 750 to (approximately) 1050 (e.g., (approximately) 90°) such that the first leg 504 extends from the backspan 508 in orthogonal (or generally orthogonal) relation. As such, upon installation of the retention clip 502 (e.g., upon connection of the retention clip 502 to the retainer 206), the first leg 504 extends in parallel (or generally parallel) relation to the axis of assembly Y (FIGS. 1, 5A). Embodiments in which the angle α may lie outside the disclosed range, however, are also envisioned herein (e.g., depending upon the particular configuration of the support bracket 300 and the actuator assembly 200) and would not be beyond the scope of the present disclosure.

The second leg 506 is non-linear in configuration and is configured for engagement (contact) with the retainer 206 to facilitate connection of the retention clip 502 to the actuator assembly 200. The second leg 506 extends from the backspan 508 at a (second) angle β, which is different from (non-identical to) the angle α, such that the legs 504, 506 extend from the backspan 508 in non-parallel relation. More specifically, in the particular embodiment illustrated, the angle β is less than the angle α and lies (substantially) within the range of (approximately) 50° to (approximately) 700 (e.g., (approximately) 65°), whereby the second leg 506 extends radially (inward) (e.g., towards the first leg 504, along the radial axis R (FIGS. 5A, 5B)). Embodiments in which the angle β may lie outside the disclosed range, however, are also envisioned herein (e.g., depending upon the particular configuration of the support bracket 300 and the actuator assembly 200) and would not be beyond the scope of the present disclosure, as are embodiments in which the angles α, β may be identical (or substantially identical) such that the legs 504, 506 extend from the backspan 508 in parallel (or generally parallel) relation.

Figure 3:
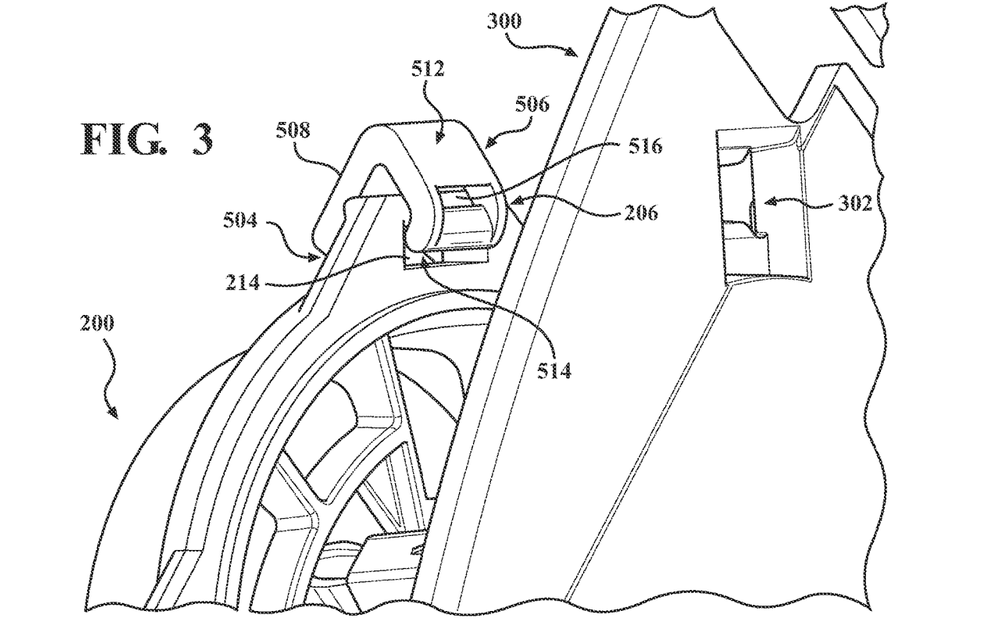
FIG. 3 is a partial, side, perspective view of the actuator assembly, the support bracket, and the anti-theft countermeasure prior to connection of the actuator assembly and the support bracket.

The second leg 506 defines an outer wall 510 (FIGS. 5A, 5B) and includes: a shank 512; a foot portion 514; and a window 516 (FIGS. 3, 5B).

The shank 512 extends from the backspan 508 and terminates in the foot portion 514. As seen in FIGS. 5A, 5B, the foot portion 514 extends radially (inward) from the shank 512 (e.g., towards the first leg 504, along the radial axis R), which attributes a non-linear (e.g., J-shaped) configuration to the second leg 506, and defines an (outer) bearing surface 518 and an (inner) guide surface 520.

The bearing surface 518 includes an arcuate configuration that defines a curved outer wall 522 (FIG. 5B), which attributes a convex (or generally convex) configuration to the bearing surface 518. The bearing surface 518 is radially offset from the outer wall 510 of the second leg 506 so as to define a relief 524. More specifically, the bearing surface 518 is inset (e.g., along the radial axis R) such that the bearing surface 518 is spaced from the first leg 504 by a first radial distance Xi and the outer wall 510 is spaced from the first leg 504 by a second, greater radial distance Xii. As described in further detail below, the relief 524 provides an ingress 526 into the window 516 (FIGS. 3, 5B) that, together with the arcuate configuration of the bearing surface 518, facilitates and directs insertion of the bracket clip 302 into the window 516.

The guide surface 520 also includes an arcuate configuration that defines a curved outer wall 528, which attributes a convex (or generally convex) configuration to the guide surface 520. The guide surface 520 is configured for engagement (contact) with the contact surface 224 defined by the end portion 222 of the trunk 216. Engagement (contact) between the guide surface 520 and the contact surface 224 facilitates rotation of the retention clip 502 in relation to actuator assembly 200 (e.g., the retainer 206) and proper installation of the retention clip 502 during assembly of the mirror assembly 10, as described in further detail below.

The window 516 (FIGS. 3, 5B) that extends through the second leg 506 and is configured to receive the outer arm 306 of the bracket clip 302 such that the outer arm 306 extends into the retention clip 502 through the window 516. As seen in FIGS. 4-6, upon insertion of the outer arm 306 into the window 516, the retention clip 502 spans (overlies, is positioned about) the bracket clip 302 and the retainer 206, as mentioned above, which inhibits (if not entirely prevents) expansion of the bracket clip 302. The retention clip 502 thus functions to constrain the bracket clip 302 and inhibits (if not entirely prevents) removal of the crossbar 212 (e.g., from the chamber 308 (FIG. 2)) that may otherwise occur upon the application of force to the support bracket 300 (e.g., a pulling force applied in parallel (or generally parallel) relation to the axis of assembly Y (FIGS. 1, 5A)), thereby locking together the support bracket 300 and the actuator assembly 200. Upon installation, the retention clip 502 also functions to conceal the bracket clip 302, which protects the connection between the bracket clip 302 and the retainer 206 and inhibits (if not entirely prevents) the direct application of an external force (e.g., to the bracket clip 302, the crossbar 212, etc.) that may otherwise result in disconnection (separation) of the support bracket 300 and the actuator assembly 200.

The backspan 508 defines a width W (FIG. 4) and extends between and connects the legs 504, 506 such that, upon installation of the retention clip 502, the backspan 508 is oriented in orthogonal (or generally orthogonal) relation to the axis of assembly Y (FIGS. 1, 5A). In various embodiments of the disclosure, it is envisioned that the stiffness (rigidity, strength) of the retention clip 502 may be altered by varying the width W of the backspan 508.

Figure 2:
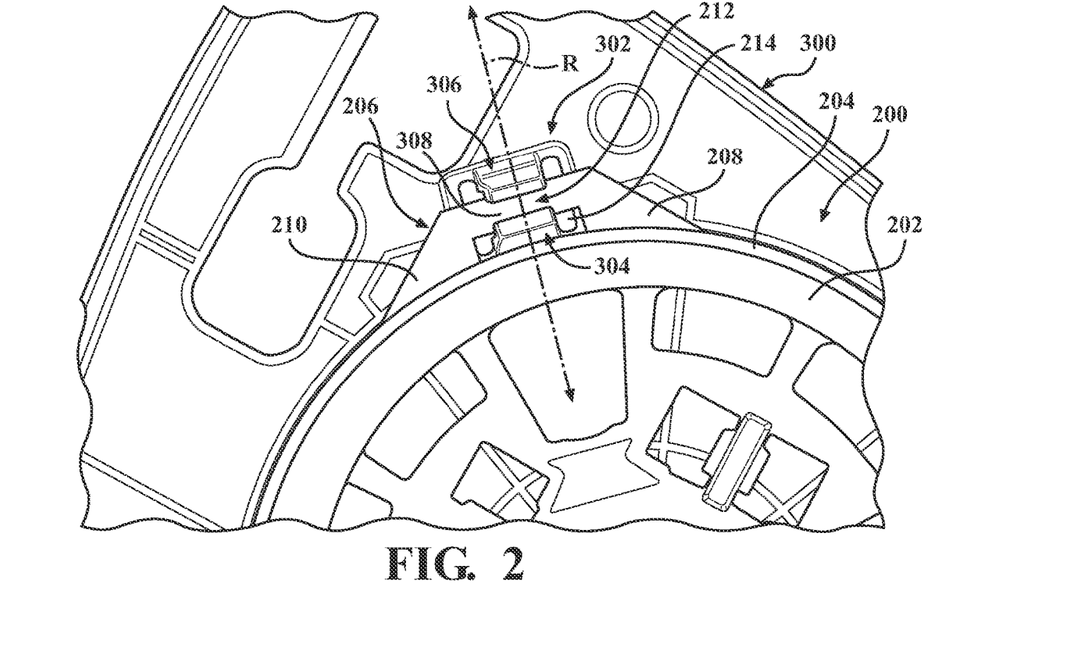
FIG. 2 is a partial, front, plan view of the mirror assembly illustrating connection of the support bracket and the actuator assembly (with the anti-theft countermeasure removed).

Referring again to FIGS. 1-6, assembly of the mirror assembly 10 will be discussed. Initially, the retention clips 502 are connected to the actuator assembly 200 by orienting the second legs 506 such that the second legs 506 engage (contact) the retainers 206 (FIGS. 2-4). More specifically, the retention clips 502 are oriented such that the foot portions 514 engage (contact) the end portions 222 of the trunks 216. The retention clips 502 are then rotated in the direction identified by the arrow 1 (FIG. 4) from an initial position P1 towards an installed (subsequent) position P2, during which, the guide surfaces 520 (FIG. 5B) traverse the contact surfaces 224, which directs the retention clips 502 and facilitates insertion of the first legs 504 into the channels 204 (FIGS. 4, 5B). As the retention clips 502 rotate, the retention clips 502 expand radially (e.g., along the radial axes R (FIGS. 5A, 5B)) in the directions identified by arrows 2 and 3 (FIG. 5B), which is facilitated by the resilient construction of the retention clip(s) 502 and results in the creation of biasing forces F1 that are oriented in the directions identified by arrows 4, 5. Rotation of the retention clips 502 continues until the first legs 504 are received by the channels 204, which, together with the engagement (contact) between the crossbars 212 and the second legs 506 (FIG. 5B) (e.g., the foot portions 514), secures the retention clips 502 to the actuator assembly 200 in a self-locking interference-fit (friction-fit) under the influence of the biasing forces F1.

The support bracket 300 is then connected to the actuator assembly 200 via insertion of the retainers 206 into the bracket clips 302, during which, the inner arms 304 enter the openings 214 (FIGS. 2, 5B) defined by the retainers 206 and the outer arms 306 engage (contact) the bearing surfaces 518 defined by the foot portions 514. The arcuate configuration of the bearing surfaces 518 causes the outer arms 306 to deflect radially outward (e.g., away from the inner arms 304, along the radial axis R) in the direction identified by arrow 2, which causes expansion of the bracket clips 302 and reconfiguration from a normal (initial) configuration into an expanded (subsequent) configuration. Outward deflection of the outer arms 306 also creates inwardly-directed biasing forces F2 (which are oriented towards the inner arms 304 in the direction identified by arrow 3) and aligns the outer arms 306 with the reliefs 524. Thereafter, continued approximation of the support bracket 300 and the actuator assembly 200 causes insertion of the outer arms 306 into the windows 516 (e.g., via the ingresses 526), during which, the outer arms 306 are guided (directed) by the curved outer walls 522 of the bearing surfaces 518 and the reliefs 524.

Upon sufficient approximation of the support bracket 300 and the actuator assembly 200, as the outer arms 306 pass the foot portions 514, the biasing forces F2 act upon the outer arms 306, which returns the bracket clips 302 to their normal configuration and causes the flanges 310, 312 (FIG. 5B) defined by the arms 304, 306 to respectively engage (contact) the shoulders 218, 220 defined by the crossbars 212, thereby connecting the support bracket 300 to the actuator assembly 200. Upon installation, the retention clips 502 are secured in place via the biasing forces F1 and span (extends across) the retainers 206 and the bracket clips 302, as seen in FIGS. 4-6, thereby constraining the bracket clips 302 so as to inhibit (if not entirely prevent) expansion thereof and removal of the crossbars 212 (e.g., from the chamber 308 (FIG. 2)). The retention clips 502 thus facilitate secured connection of the actuator assembly 200 and the support bracket 300 (via the interface between the retainers 206 and the bracket clips 302) and inhibit (if not entirely prevent) unauthorized separation thereof that may otherwise occur, thereby deterring theft of the mirror glass 400.

In addition to the theft-deterrent features described above, the retention clip(s) 502 provide improved visibility vis-à-vis known anti-theft countermeasures. For example, due to the configuration of the retention clip(s) 502, any encroachment of the retention clip(s) 502 upon the mirror glass 400 is eliminated. Moreover, the mechanical connection between the actuator assembly 200 and the support bracket 300 facilitated and protected by the retention clip(s) 502 eliminates the need for any (direct) adhesive connection of the retention clip(s) 502 to either the support bracket 300 or the mirror glass 400, which is often required by known anti-theft countermeasures. Such adhesive connections can be unreliable, unpredictable, and subject to failure as a result of the use of inconsistent (non-standardized) materials of construction by the OEMs.

With reference now to FIGS. 7-11, an alternate embodiment of the mirror assembly will be discussed, which is identified by the reference character 20. The mirror assembly 20 is substantially similar in both structure and function to the mirror assembly 10 discussed above (FIGS. 1-6) and, accordingly, in the interest of brevity, will only be discussed with respect to any differences therefrom. As such, identical reference characters will be utilized to refer to elements, structures, features, etc., common to the mirror assemblies 10, 20. As described in detail below, in addition to the outer housing 100 (FIG. 1) and the mirror glass 400, the mirror assembly 20 includes: an actuator assembly 600; a (first) support bracket 700; and an anti-theft countermeasure 800.

The actuator assembly 600 and the support bracket 700 are releasable connectable via corresponding attachment structures 626, 714 (FIG. 7) (e.g., tabs, clips, etc.) that are configured for engagement (contact) in a snap-fit arrangement, which facilitates connection and disconnection of the actuator assembly 600 and the support bracket 700. While the actuator assembly 600 and the support bracket 700 are shown as being connected by eight attachment structures 626, 714 in the particular embodiment illustrated, respectively, it should be appreciated that the particular number of attachment structures 626, 714 may be altered in various embodiments without departing from the scope of the present disclosure. As such, embodiments of actuator assembly 600 and the support bracket 700 including both greater and fewer numbers of respective attachment structures 626, 714 are also contemplated herein and would not be beyond the scope of the present disclosure.

Figure 7:
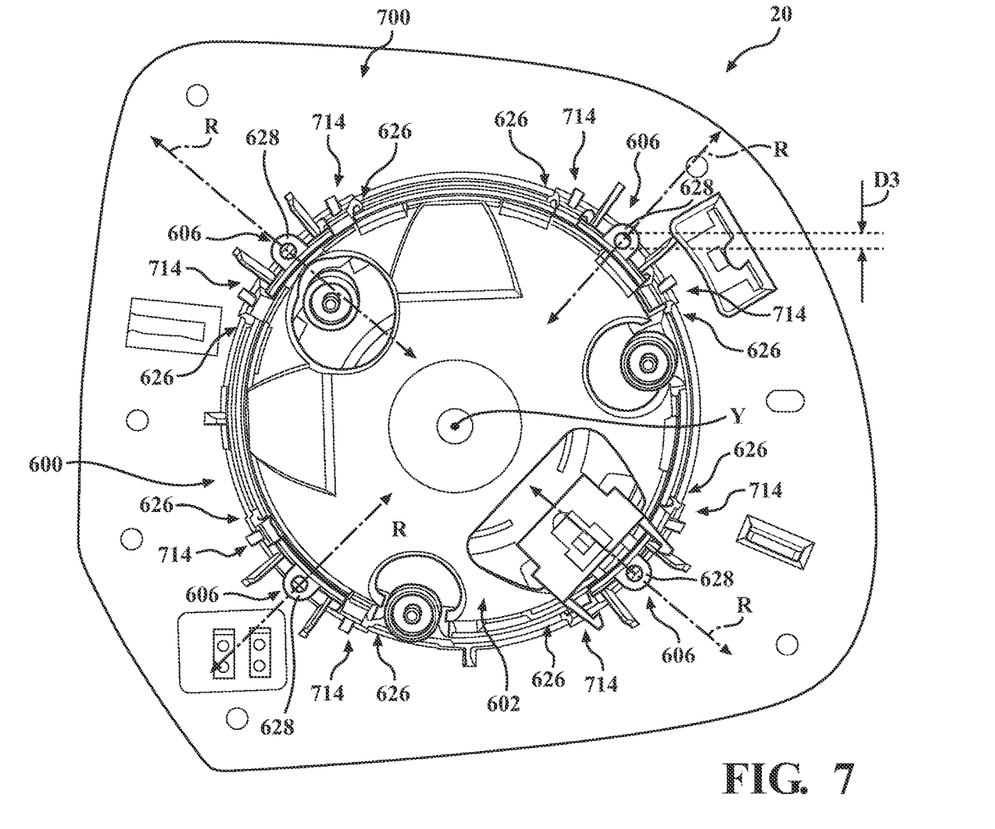
FIG. 7 is a front, plan view of the support bracket and the actuator assembly according to an alternate embodiment of the disclosure.

The actuator assembly 600 includes a main body portion 602 and one or more retainers 606 (FIGS. 7, 11), each of which defines a receptacle 628 and is located between adjacent attachment structures 626. As such, in the particular embodiment illustrated the actuator assembly 600 includes four retainers 606, which extend radially outward from the main body portion 602 along radial axes R (FIG. 7). It should be appreciated, however, that the particular number of retainers 606 may be altered in various embodiments without departing from the scope of the present disclosure. As such, embodiments of the actuator assembly 600 including both greater and fewer numbers of retainers 606 are also contemplated herein and would not be beyond the scope of the present disclosure.

The anti-theft countermeasure 800 includes a (second) retention bracket 830 that is configured for positioning about the actuator assembly 600. As described in detail below, the retention bracket 830 includes a locking ring (guard, collar) 832, which is configured in correspondence with an outer contour (profile) defined by the actuator assembly 600, and one or more anchors 834 that extend from the locking ring 832. The retention bracket 830 is configured so as to define a (first) radial (transverse) cross-sectional area (footprint), which extends in orthogonal (or generally orthogonal) relation to the axis of assembly Y (FIGS. 7, 8, 11) and in parallel (or generally parallel) relation to the radial axes R, that is less than a corresponding (second) radial (transverse) cross-sectional area (footprint) defined by the support bracket 700. As such, upon assembly of the mirror assembly 20, the retention bracket 830 is concealed, and hidden from view, by the support bracket 700 (and the mirror glass 400), as seen in FIG. 7, for example.

The locking ring 832 is integral (e.g., unitary, monolithic) in construction and defines an annular (or generally annular) aperture (window) 836 that is configured to receive the actuator assembly 600 such that the actuator assembly 600 extends into (e.g., through) the retention bracket 830. In certain embodiments, it is envisioned that the locking ring 832 may include an adhesive (not shown) (e.g., double-sided tape) that is located on an inner surface 838 thereof to facilitate (adhesive) connection of the retention bracket 830 to the actuator assembly 600 and reduce (if not entirely eliminate) undesirable relative movement (e.g., shaking, rattling, etc.) therebetween.

To allow for proper positioning of the locking ring 832 about the actuator assembly 600, in certain embodiments, such as that illustrated in FIGS. 7-11, the locking ring 832 may include one or more recesses 840 (FIG. 8) (e.g., cutouts, notches, etc.) that are configured to receive one or more components or sections of the actuator assembly 600. In various embodiments of the disclosure, it is envisioned that the configuration of the recesses 840 may be either identical or non-identical (e.g., depending upon the particular configuration of the actuator assembly 600).

Figure 11:
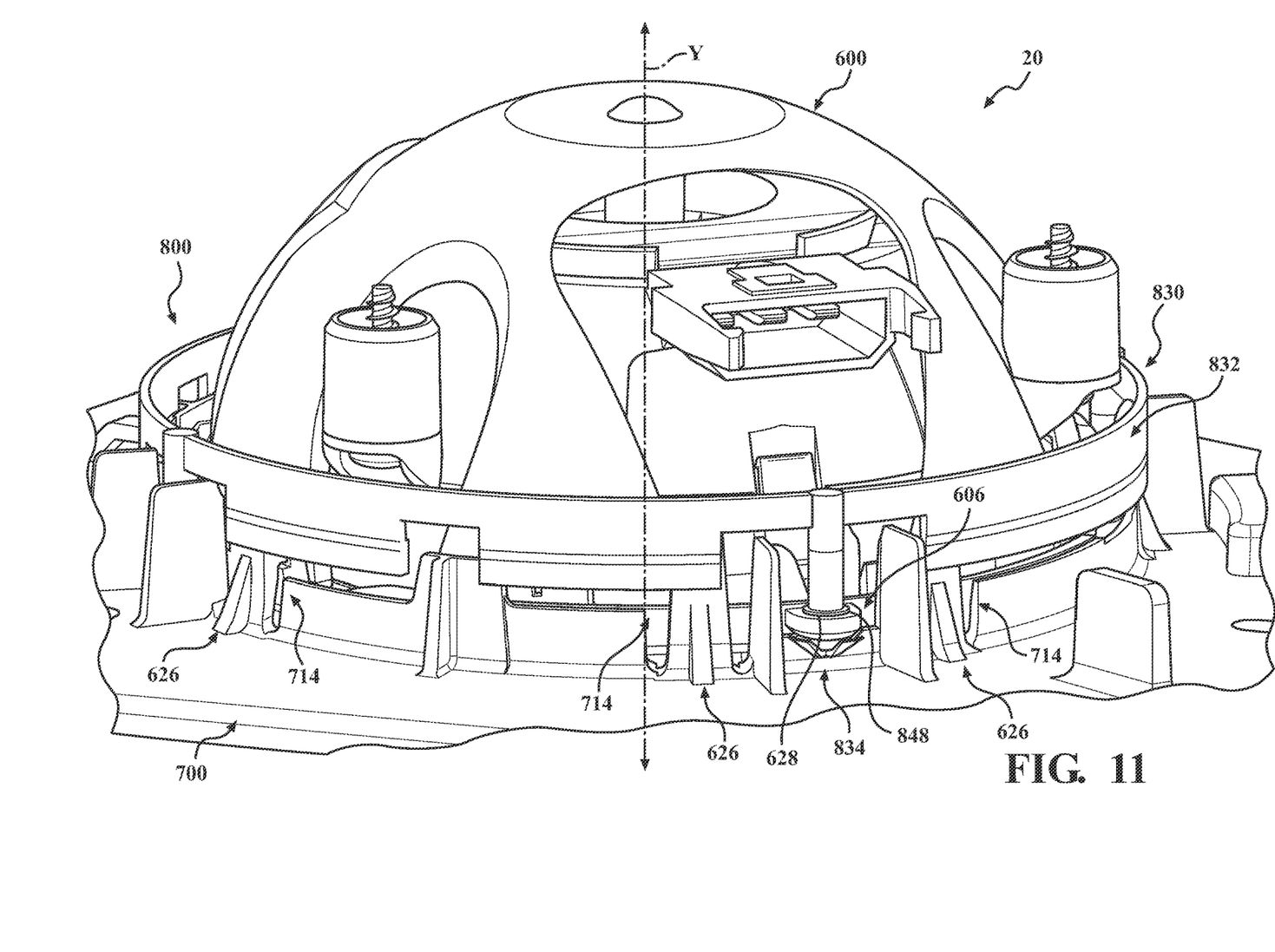
FIG. 11 is a side, perspective view illustrating connection of the support bracket and the actuator assembly seen in FIG. 7 and the anti-theft countermeasure seen in FIGS. 8 and 9.

As seen in FIG. 11, the locking ring 832 is configured to overlie (cover, obscure) and conceal the attachment structures 626, 714 upon connection of the retention bracket 830 to the actuator assembly 600. The locking ring 832 thus inhibits (if not entirely prevents) the direct application of an external force to the attachment structures 626, 714 that may otherwise result in deflection of the attachment structures 626, 714 and, thus, disconnection (separation) of the actuator assembly 600 and the support bracket 700, thereby deterring theft of the mirror glass 400 (FIG. 1).

Figure 8:
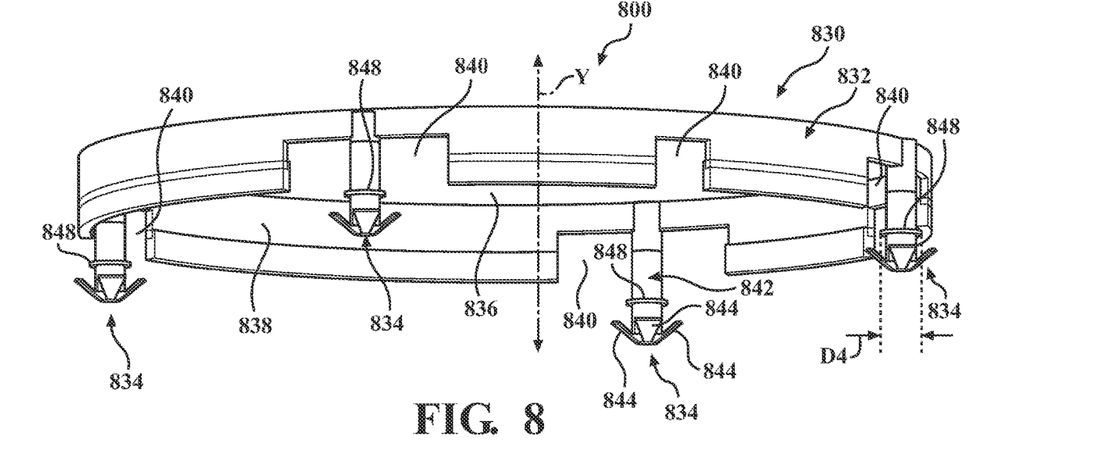
FIG. 8 is a side, perspective view of an alternate embodiment of the anti-theft countermeasure for use with the support bracket and the actuator assembly seen in FIG. 7, which includes a locking ring and one or more anchors.
Figure 9:
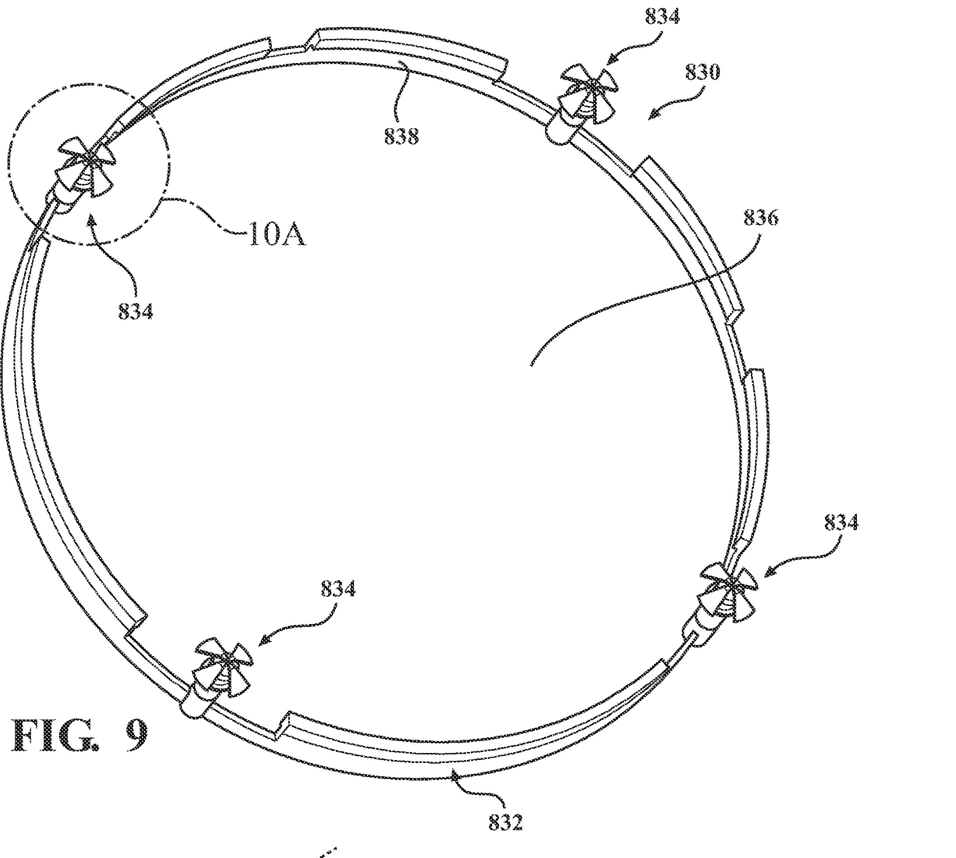
FIG. 9 is a rear, perspective view of the anti-theft countermeasure seen in FIG. 8.

The anchor(s) 834 extend from the locking ring 832 in parallel (or generally parallel) relation to the axis of assembly Y, as seen in FIGS. 7, 8, and 11. More specifically, in the particular embodiment illustrated, each anchor 834 is located within a corresponding recess 840 in the locking ring 832. Although shown as being integrally (e.g., unitarily, monolithically) formed with the locking ring 832 from a single piece of material, embodiments are also envisioned in which the anchor(s) 834 and the locking ring 832 may be formed as separate, discrete components that may be fixedly or releasably connected in any suitable manner. For example, it is envisioned that the anchor(s) 834 and the locking ring 832 may be configured for engagement (contact) in a press-fit (interference fit) arrangement, via the use of mechanical fasteners (e.g., screws, pins, bolts, clips, etc.), via the use of an adhesive, etc.

The anchor(s) 834 include (e.g., are formed partially or entirely from) a resilient material and are configured for insertion into the receptacle(s) 628 (FIGS. 7, 11) so as to connect the retention bracket 830 and the actuator assembly 600. As such, in the particular embodiment illustrated, the retention bracket 830 includes four anchors 834 that are configured for respective insertion into the receptacles 628 defined by the retainers 606. It should be appreciated, however, that the particular number of anchors 834 may be altered in various embodiments without departing from the scope of the present disclosure (e.g., depending upon the particular configuration of the actuator assembly 600). As such, embodiments including both greater and fewer numbers of anchors 834 are also contemplated herein and would not be beyond the scope of the present disclosure.

Each anchor 834 includes a shaft (post) 842 (FIGS. 8, 10A, 10B) and a plurality of leaves 844 that extend radially outward from the shaft 842. More specifically, the leaves 844 are connected to the shaft 842 via hinge portions 846 such that the leaves 844 are movable in relation to the shaft 842 and resilient reconfiguration of the anchor(s) 834 between a normal (initial) configuration (FIG. 10A), in which the anchor(s) 834 each define a (first) transverse cross-sectional dimension (e.g., a diameter) D1, and a deflected (subsequent) configuration (FIG. 10B), in which the anchor(s) 834 each define a (second) transverse cross-sectional dimension (e.g., a diameter) D2 that is less than the transverse cross-sectional dimension D1.

Figures 10A, 10B:
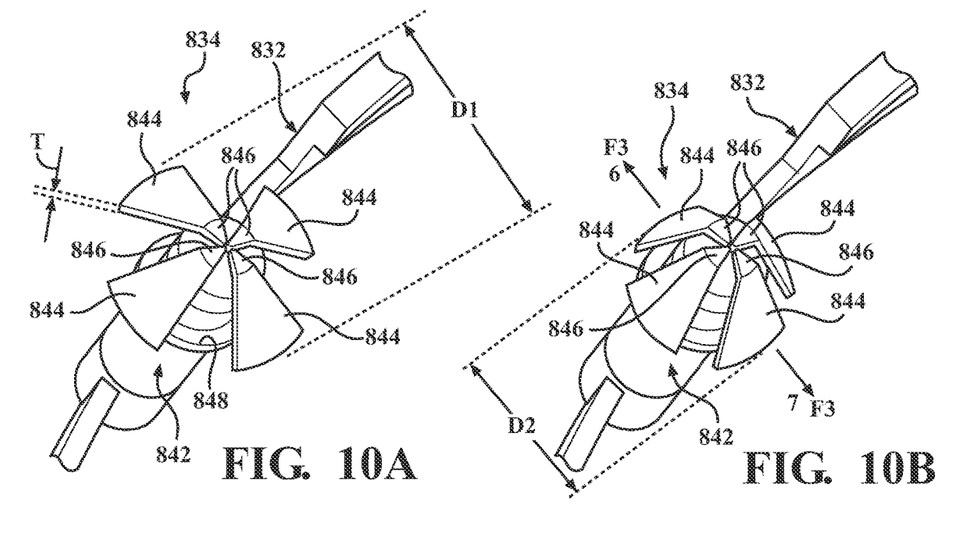
FIG. 10A is an enlargement of the area of detail identified in FIG. 9 with one of the anchors shown in a normal configuration.
FIG. 10B is a rear, perspective view of one of the anchors shown in a deflected configuration.

In the particular embodiment of the disclosure illustrated, the leaves 844 defines a uniform (or generally uniform) thickness T (FIG. 10A). Embodiments are also envisioned, however, in which the thickness T may be non-uniform. For example, it is envisioned that the thickness T of the leaves 844 may be reduced at (or adjacent to) the point of connection to the shaft 842 so as to define weakened portions (e.g., living hinges) and further facilitate reconfiguration of the anchor(s) 834 between the normal configuration and the deflected configuration.

Although shown as including four leaves 844 in the particular embodiment illustrated, it should be appreciated that the particular number of leaves 844 may be altered in various embodiments without departing from the scope of the present disclosure. As such, embodiments of the anchor(s) 834 including both greater and fewer numbers of leaves 844 are also contemplated herein and would not be beyond the scope of the present disclosure.

As seen in FIG. 7, each of the receptacles 628 defines a (third) inner transverse cross-sectional dimension (e.g., a diameter) D3, which is less than the transverse cross-sectional dimension D1 (FIG. 10A), but greater than the transverse cross-sectional dimension D2 (FIG. 10B), i.e., the first transverse cross-sectional dimension exceeds the third transverse cross-sectional dimension. As such, during insertion of the anchor(s) 834 into the receptacle(s) 628, the leaves 844 are deflected radially inward, which results in reconfiguration of the anchor(s) 834 from the normal configuration into the deflected configuration and the creation of biasing forces F3 that are directed radially outwards (e.g., away from the shaft 842) in the directions identified by arrows 6, 7. Upon complete insertion of the anchor(s) 834 into the receptacle(s) 628, the anchor(s) 834 are automatically returned to the normal configuration under the influence of the biasing forces F3, which is facilitated by the resilient construction of the anchor(s) 834. Upon returning to the normal configuration, the anchor(s) 834 are secured within the receptacle(s) 628, which connects the retention bracket 830 to the actuator assembly 600 in a manner that inhibits (if not entirely prevents) disconnection (separation, detachment) thereof.

In certain embodiments of the disclosure, such as that illustrated in FIGS. 7-11, it is envisioned that each of the anchors 834 may further include a stop 848 to inhibit (if not entirely prevent) over-insertion into the receptacle(s) 628 and over-advancement of the retention bracket 830. As seen in FIG. 8, for example, the stop 848 is located on the shaft 842 between the locking ring 832 and the leaves 844 and is spaced axially from the leaves 844 such that the leaves 844 extend towards the stop 848. The stop 848 defines a (fourth) transverse cross-sectional dimension (e.g., a diameter) D4 (FIG. 8) that is greater than the transverse cross-sectional dimension D3 (FIG. 7), which results in engagement (contact) between the stop 848 and the receptacle 628 during connection of the retention bracket 830 to the actuator assembly 600 to inhibit (if not entirely prevent) continued travel of the retention bracket 830.

Figure 12:
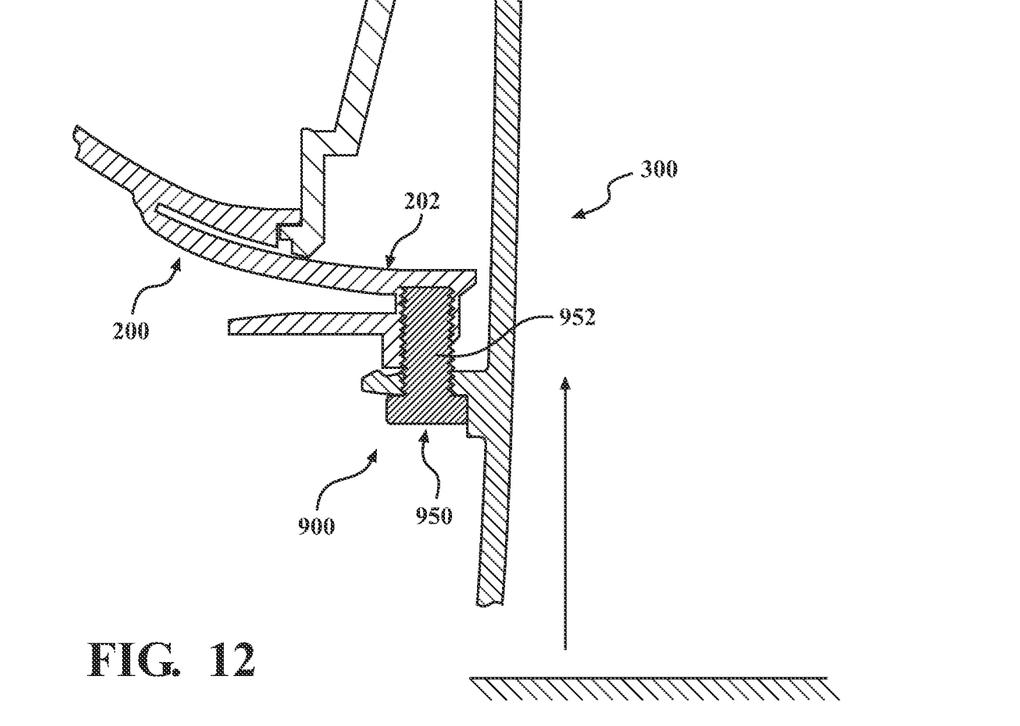
FIG. 12 is a longitudinal (vertical), cross-sectional view of the support bracket and the actuator assembly seen in FIG. 1 shown with an alternate embodiment of the anti-theft countermeasure.
Figure 13:
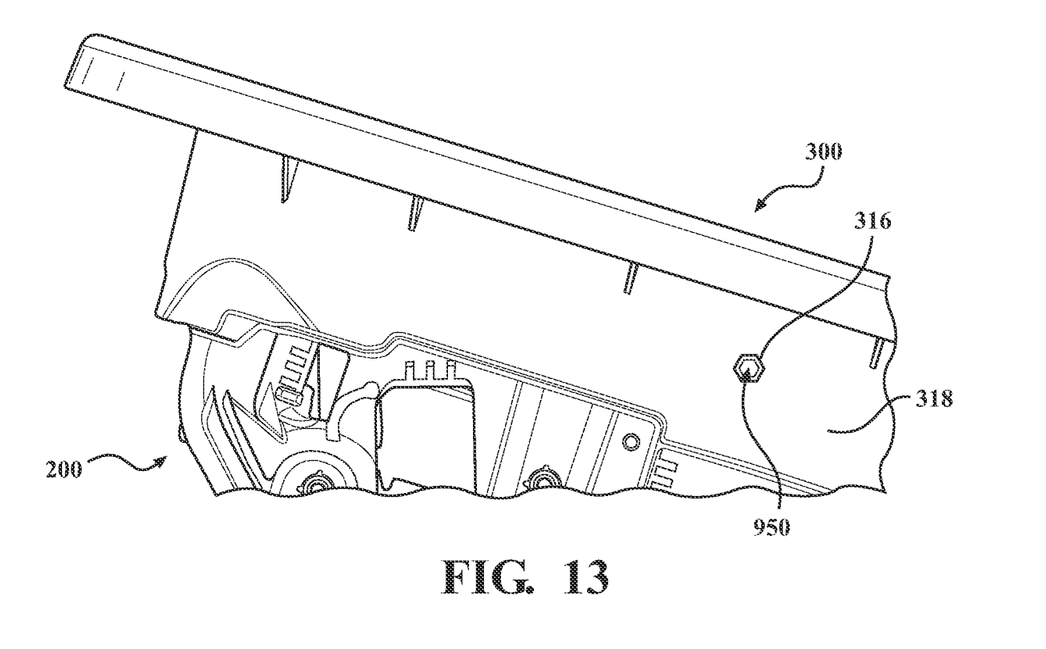
FIG. 13 is a side, plan view of the support bracket, the actuator assembly, and the anti-theft countermeasure seen in FIG. 12.
Figure 14:
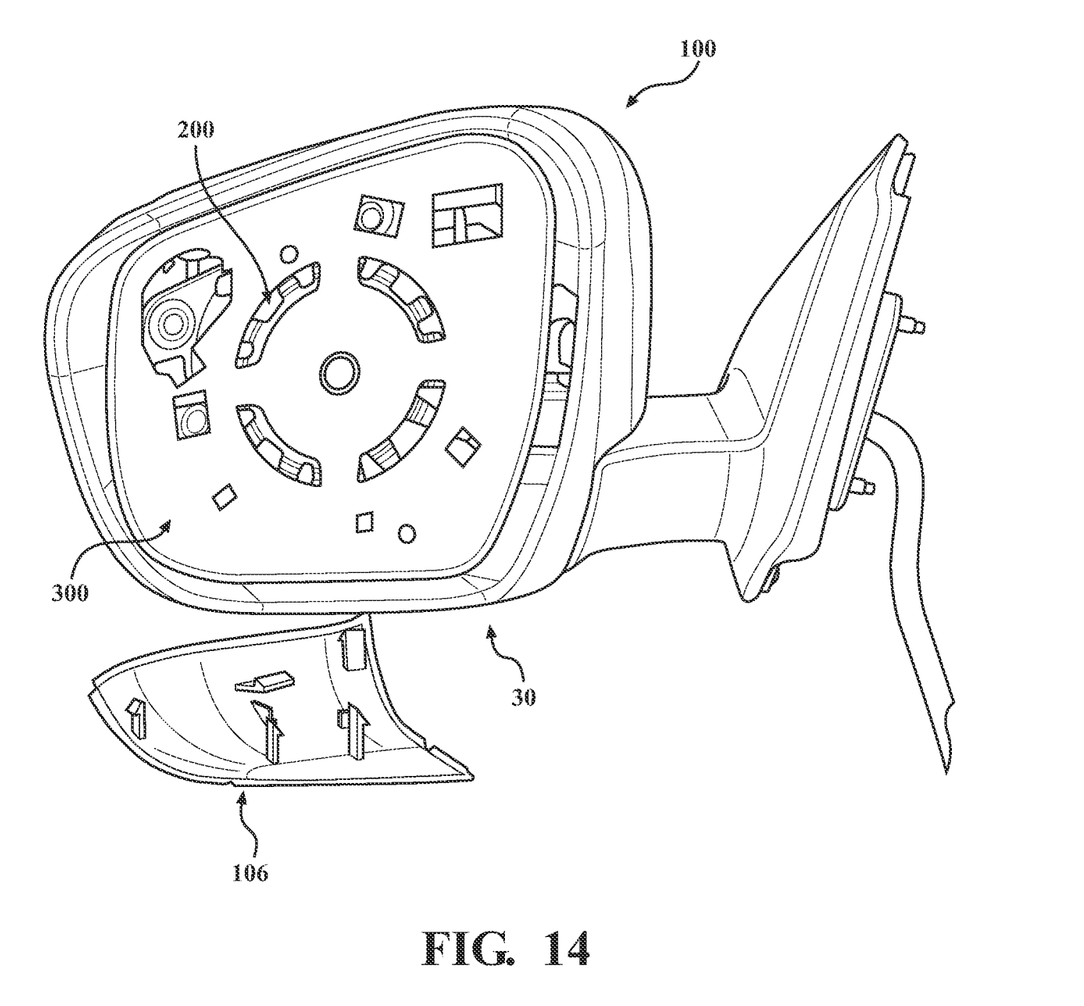
FIG. 14. is a rear, perspective view of the support bracket, the actuator assembly, and the outer housing, which is shown with a removable panel detached to facilitate access to the anti-theft countermeasure seen in FIG. 12.

With reference now to FIGS. 12-14, an alternate embodiment of the mirror assembly will be discussed, which is identified by the reference character 30. The mirror assembly 30 is substantially similar in both structure and function to the mirror assembly 10 discussed above (FIGS. 1-6) and, accordingly, in the interest of brevity, will only be discussed with respect to any differences therefrom. As such, identical reference characters will be utilized to refer to elements, structures, features, etc., common to the mirror assemblies 10, 30. As described in detail below, in addition to the outer housing 100 (FIG. 1), the actuator assembly 200, the support bracket 300, and the mirror glass 400 (FIG. 1), the mirror assembly 20 includes an anti-theft countermeasure 900.

In the particular embodiment of the disclosure illustrated in FIGS. 12-14, the anti-theft countermeasure 900 is provided as a standalone means of deterring theft of the mirror glass 400, as described in detail below. Embodiments are also envisioned, however, in which the anti-theft countermeasure 900 may be utilized in conjunction with the anti-theft countermeasure 500 (FIGS. 1-6) or the anti-theft countermeasure 800 (FIGS. 7-11) as an additional deterrent to theft.

The anti-theft countermeasure 900 includes a fastener 950 (FIG. 12) that extends through the support bracket 300 and into the actuator assembly 200 (e.g., the main body portion 202). Although shown as a self-tapping screw 952 in the particular embodiment illustrated, it is envisioned that the particular configuration of the fastener 950 may be altered in various embodiments without departing from the scope of the present disclosure and that the anti-theft countermeasure 900 may include any structure or component suitable for the intended purpose of securing together the actuator assembly 200 and the support bracket 300 in the manner described herein. For example, it is envisioned that the anti-theft countermeasure 900 may include a spring clip, a pin, a bolt, etc.

Additionally, while the mirror assembly 30 is shown as including a single fastener 950 in the particular embodiment illustrated, it should be appreciated that the number of fasteners 950 may be altered in various embodiments without departing from the scope of the present disclosure. As such, embodiments including greater numbers of fasteners 950 are also contemplated herein and would not be beyond the scope of the present disclosure.

The fastener 950 is inserted into, and accessed through, an opening 316 (FIG. 13) in the support bracket 300. More specifically, in the particular embodiment illustrated, the opening 316 is formed in a lower (bottom) surface 318 of the support bracket 300. To obscure the opening 316 from view and conceal the fastener 950, in certain embodiments, it is envisioned that the outer housing 100 may include a removable (lower) panel (cover) 106 (FIG. 14) that can be detached to provide access to the fastener 950 (e.g., during repair and/or maintenance). It is envisioned, however, that the particular location of the opening 316 and the fastener 950 may be varied in alternate embodiments (e.g., depending on the configuration of the mirror assembly 30, the style of the mirror assembly 30, etc.) without departing from the scope of the present disclosure.

The anti-theft countermeasure 900 offers an inexpensive, simple means of securing together the actuator assembly 200 and the support bracket 300 to inhibit separation of the support bracket 300 and thereby deter theft of the mirror glass 400 (FIG. 1). Additionally, given the flexibility in the location of the anti-theft countermeasure 900 and the ability to install the anti-theft countermeasure 900 in an inconspicuous location, the anti-theft countermeasure 900 provides improved visibility vis-à-vis known anti-theft countermeasures.

Persons skilled in the art will understand that the various embodiments of the disclosure described herein and shown in the accompanying figures constitute non-limiting examples, and that additional components and features may be added to any of the embodiments discussed hereinabove without departing from the scope of the present disclosure. Additionally, persons skilled in the art will understand that the elements and features shown or described in connection with one embodiment may be combined with those of another embodiment without departing from the scope of the present disclosure and will appreciate further features and advantages of the presently disclosed subject matter based on the description provided. Variations, combinations, and/or modifications to any of the embodiments and/or features of the embodiments described herein that are within the abilities of a person having ordinary skill in the art are also within the scope of the disclosure, as are alternative embodiments that may result from combining, integrating, and/or omitting features from any of the disclosed embodiments.

Use of broader terms such as "comprises," "includes," and "having" should be understood to provide support for narrower terms such as "consisting of," "consisting essentially of," and "comprised substantially of." Accordingly, the scope of protection is not limited by the description set out above but is defined by the claims that follow and includes all equivalents of the subject matter of the claims.

In the preceding description, reference may be made to the spatial relationship between the various structures illustrated in the accompanying drawings, and to the spatial orientation of the structures. However, as will be recognized by those skilled in the art after a complete reading of this disclosure, the structures described herein may be positioned and oriented in any manner suitable for their intended purpose. Thus, the use of terms such as "above," "below," "upper," "lower," "inner," "outer," "left," "right," "upward," "downward," "inward," "outward," etc., should be understood to describe a relative relationship between the structures and/or a spatial orientation of the structures. Those skilled in the art will also recognize that the use of such terms may be provided in the context of the illustrations provided by the corresponding figure(s).

Additionally, terms such as "approximately," "generally," "substantially," and the like should be understood to allow for variations in any numerical range or concept with which they are associated and encompass variations on the order of 25% (e.g., to allow for manufacturing tolerances and/or deviations in design). For example, the term "generally parallel" should be understood as referring to a configuration in with the pertinent components are oriented so as to define an angle therebetween that is equal to 180°±25% (e.g., an angle that lies within the range of (approximately) 135° to (approximately) 225°).

Although terms such as "first," "second," "third," etc., may be used herein to describe various operations, elements, components, regions, and/or sections, these operations, elements, components, regions, and/or sections should not be limited by the use of these terms in that these terms are used to distinguish one operation, element, component, region, or section from another. Thus, unless expressly stated otherwise, a first operation, element, component, region, or section could be termed a second operation, element, component, region, or section without departing from the scope of the present disclosure.

Each and every claim is incorporated as further disclosure into the specification and represents embodiments of the present disclosure. Also, the phrases "at least one of A, B, and C" and "A and/or B and/or C" should each be interpreted to include only A, only B, only C, or any combination of A, B, and C.

What is claimed is:

1. A mirror assembly for a vehicle, the mirror assembly comprising:
   a support bracket including a bracket clip, wherein the bracket clip includes first and second arms;
   a mirror glass connected to the support bracket;
   an actuator assembly including a retainer extending between the first and second arms and into the bracket clip such that movement of the actuator assembly causes corresponding movement of the support bracket to reposition the mirror glass; and
   a retention clip overlying the retainer and the bracket clip to inhibit separation of the support bracket and the actuator assembly and thereby deter theft of the mirror glass.

2. The mirror assembly of claim 1, wherein the support bracket includes a plurality of bracket clips, and the actuator assembly includes a plurality of retainers.

3. The mirror assembly of claim 2, wherein the plurality of bracket clips are separated by an angular distance of approximately 90°, and the plurality of retainers are separated by an angular distance of approximately 90°.

4. The mirror assembly of claim 1, wherein the retention clip includes:
   a first leg;
   a second leg; and a backspan connecting the first leg and the second leg, wherein the first leg extends from the backspan at a first angle and the second leg extends from the backspan at a second angle.

5. The mirror assembly of claim 4, wherein the first angle and the second angle are non-identical such that the first leg and the second leg extend in non-parallel relation.

6. The mirror assembly of claim 5, wherein the second angle is less than the first angle such that the second leg extends towards the first leg.

7. The mirror assembly of claim 4, wherein the second leg defines a guide surface configured for engagement with the retainer to facilitate rotation of the retention clip in relation to the actuator assembly and proper installation of the retention clip.

8. The mirror assembly of claim 4, wherein the second leg defines a window configured to receive the bracket clip such that the bracket clip extends into the retention clip.

9. The mirror assembly of claim 4, wherein the actuator assembly includes a main body portion defining a channel extending about a periphery thereof, the retainer extending radially outward from the main body portion.

10. The mirror assembly of claim 9, wherein the first leg is configured for insertion into the channel.

11. A mirror assembly for a vehicle, the mirror assembly comprising:
an outer housing;
a support bracket located within the outer housing and including a bracket clip;
an actuator assembly including a retainer extending internally into the bracket clip so as connect the support bracket and the actuator assembly;
a mirror glass connected to the support bracket; and
a retention clip connected to the actuator assembly in an interference fit such that the retention clip spans the bracket clip and the retainer so as to inhibit removal of the retainer from the bracket clip, thereby locking together the support bracket and the actuator assembly.

12. The mirror assembly of claim 11, wherein the retention clip defines a window, the bracket clip extending into the retention clip through the window.

13. The mirror assembly of claim 11, wherein the retention clip includes:
a backspan; and
a pair of legs extending from the backspan in non-parallel relation.

14. The mirror assembly of claim 13, wherein the pair of legs include non-identical configurations.

15. The mirror assembly of claim 13, wherein the retention clip further includes a foot in engagement with the retainer.

16. A mirror assembly for a vehicle, the mirror assembly comprising:
a support bracket;
a mirror glass connected to the support bracket;
an actuator assembly including a retainer defining a receptacle, the support bracket and the actuator assembly including corresponding attachment structures configured for engagement to thereby connect the support bracket and the actuator assembly such that movement of the actuator assembly causes corresponding movement of the support bracket to reposition the mirror glass; and
a retention bracket configured for positioning about the actuator assembly, the retention bracket including:
a locking ring configured to overlie the corresponding attachment structures so as to inhibit disconnection of the support bracket and the actuator assembly and thereby deter theft of the mirror glass; and
an anchor extending from the locking ring and configured for insertion into the receptacle to thereby connect the retention bracket and the actuator assembly.

17. The mirror assembly of claim 16, wherein the anchor is resiliently reconfigurable between a normal configuration, in which the anchor defines a first transverse cross-sectional dimension, and a deflected configuration, in which the anchor defines a second transverse cross-sectional dimension less than the first transverse cross-sectional dimension.

18. The mirror assembly of claim 17, wherein the receptacle defines a third transverse cross-sectional dimension, the first transverse cross-sectional dimension exceeding the third transverse cross-sectional dimension such that, upon insertion into the receptacle, the anchor inhibits disconnection of the retention bracket and the actuator assembly.

19. The mirror assembly of claim 17, wherein the anchor includes:
a shaft; and
a plurality of leaves extending radially outward from the shaft such that the plurality of leaves are movable in relation to the shaft during reconfiguration of the anchor between the normal configuration and the deflected configuration.

20. The mirror assembly of claim 19, wherein the anchor further includes a stop located on the shaft and configured for engagement with the receptacle to inhibit over-advancement of the retention bracket.

* * * * *